(12) United States Patent
Chai et al.

(10) Patent No.: US 8,832,711 B1
(45) Date of Patent: *Sep. 9, 2014

(54) USER INTERFACE FOR EVENT-DRIVEN STATE THREAD ARCHITECTURE

(75) Inventors: Mu Chai, Bellevue, WA (US); Jeff Beeghly, Seattle, WA (US); Patrick Michael Simonich, Renton, WA (US); Troy Thompson, Bellevue, WA (US)

(73) Assignee: EMC Corporation, Hopkinton, MA (US)

( * ) Notice: Subject to any disclaimer, the term of this patent is extended or adjusted under 35 U.S.C. 154(b) by 1066 days.

This patent is subject to a terminal disclaimer.

(21) Appl. No.: 11/968,029

(22) Filed: Dec. 31, 2007

(51) Int. Cl.
*G06F 9/46* (2006.01)
(52) U.S. Cl.
USPC .......................................... 718/106; 718/102
(58) Field of Classification Search
USPC ........................................................ 719/314
See application file for complete search history.

(56) References Cited

U.S. PATENT DOCUMENTS

| | | | |
|---|---|---|---|
| 4,761,732 A * | 8/1988 | Eldumiati et al. ............ | 710/263 |
| 5,355,488 A * | 10/1994 | Cox et al. ..................... | 718/100 |
| 6,684,259 B1 * | 1/2004 | Discavage et al. ............ | 719/316 |
| 6,728,960 B1 | 4/2004 | Loomans | |
| 6,904,597 B2 * | 6/2005 | Jin ................................ | 719/314 |
| 7,080,375 B2 | 7/2006 | Martin | |
| 7,337,444 B2 * | 2/2008 | Browning et al. ............ | 718/107 |
| 7,559,065 B1 | 7/2009 | Sosnovsky et al. | |

OTHER PUBLICATIONS

U.S. Appl. No. 11/967,875, filed Dec. 31, 2007, Mu Chai.
U.S. Appl. No. 11/967,875, Jun. 23, 2011, Office Action.
U.S. Appl. No. 11/967,875, Feb. 2, 2012, Final Office Action.
U.S. Appl. No. 11/967,875, Dec. 5, 2012, Office Action.

* cited by examiner

*Primary Examiner* — Meng An
*Assistant Examiner* — Wissam Rashid
(74) *Attorney, Agent, or Firm* — Workman Nydegger

(57) ABSTRACT

An application framework is disclosed for handling predefined events for various application modules executing as threads. Events are received and associated with a thread and an event handling function. Event handling functions are classified as mutually exclusive and non-mutually exclusive. Mutually exclusive functions are blocked while another mutually exclusive function is executing. Event handling functions are processed by setting a corresponding thread to execute the function and placing the thread in a 'non-wait' state. Threads in the 'non-wait' state are then executed concurrently under the control of a system thread manger and are returned to a 'wait' state when the handling function ends. Each such thread maintains the session state throughout use of the application.

17 Claims, 7 Drawing Sheets

USER INTERFACE FOR EVENT-DRIVEN STATE THREAD ARCHITECTURE

BACKGROUND OF THE INVENTION

1. The Field of the Invention

The present invention relates to computer applications and, more particularly, to applications executing multiple distinct modules.

2. The Relevant Technology

Many applications, particularly those for use by consumers, are event-driven. Processing is centered on events generated by the user, such as mouse movements and clicks, key presses, and the like. Execution consists of catching events and processing them according to the applications handling functions. Modern applications may be extremely complex and are often organized into a number of modules, each relating to a specific task or class of tasks. Although the modules may not interact with one another, they typically operate subject to the control of a main application.

A common architecture for applications is an Event-driven State Machine (EDSM). The EDSM receives events from each module or web-based user and processes them one at a time, thus multiplexing multiple currently executing modules or web-based sessions. Each module or web-based session is a separate context comprising data indicating its current processing state.

The EDSM architecture is ineffective in many respects. Because each session is a monolithic application, it must internally maintain data regarding the state of each module or user session. It further must manage switching between contexts of each module or user session, including prioritizing, allocating resources, optimizing processor efficiency by ensuring that the active context is not waiting for another resource such as a printer or hard drive. This complexity of EDSM architectures requires a great deal of processor time and makes them difficult to design, program, and debug.

In view of the foregoing it would be an advancement in the art to provide an architecture for modular applications that overcomes many of the deficiencies of the EDSM architecture.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
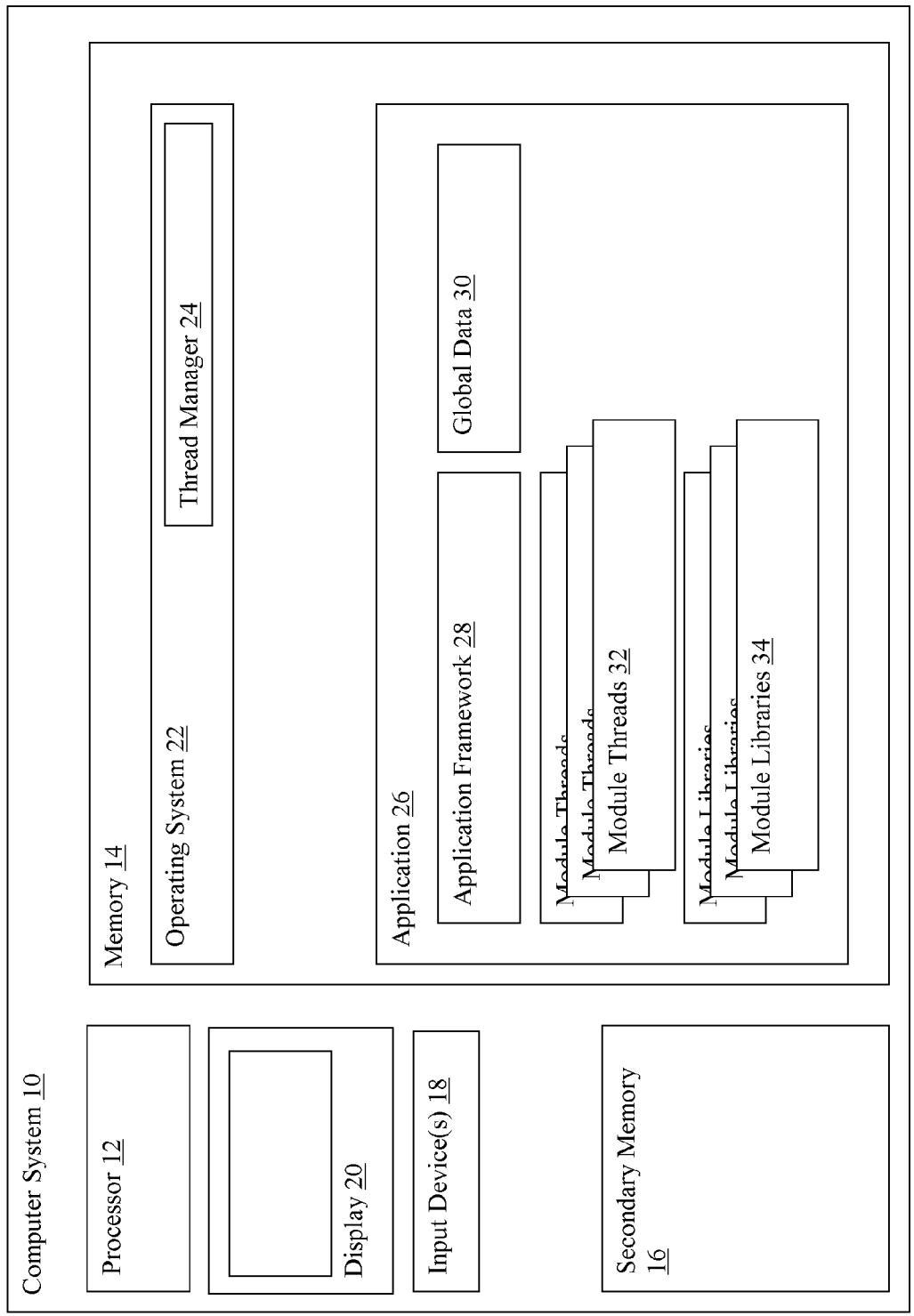
FIG. 1 is a schematic block diagram of a computer system hosting an application having event-driven state threads in accordance with an embodiment of the present invention.
Figure 2:
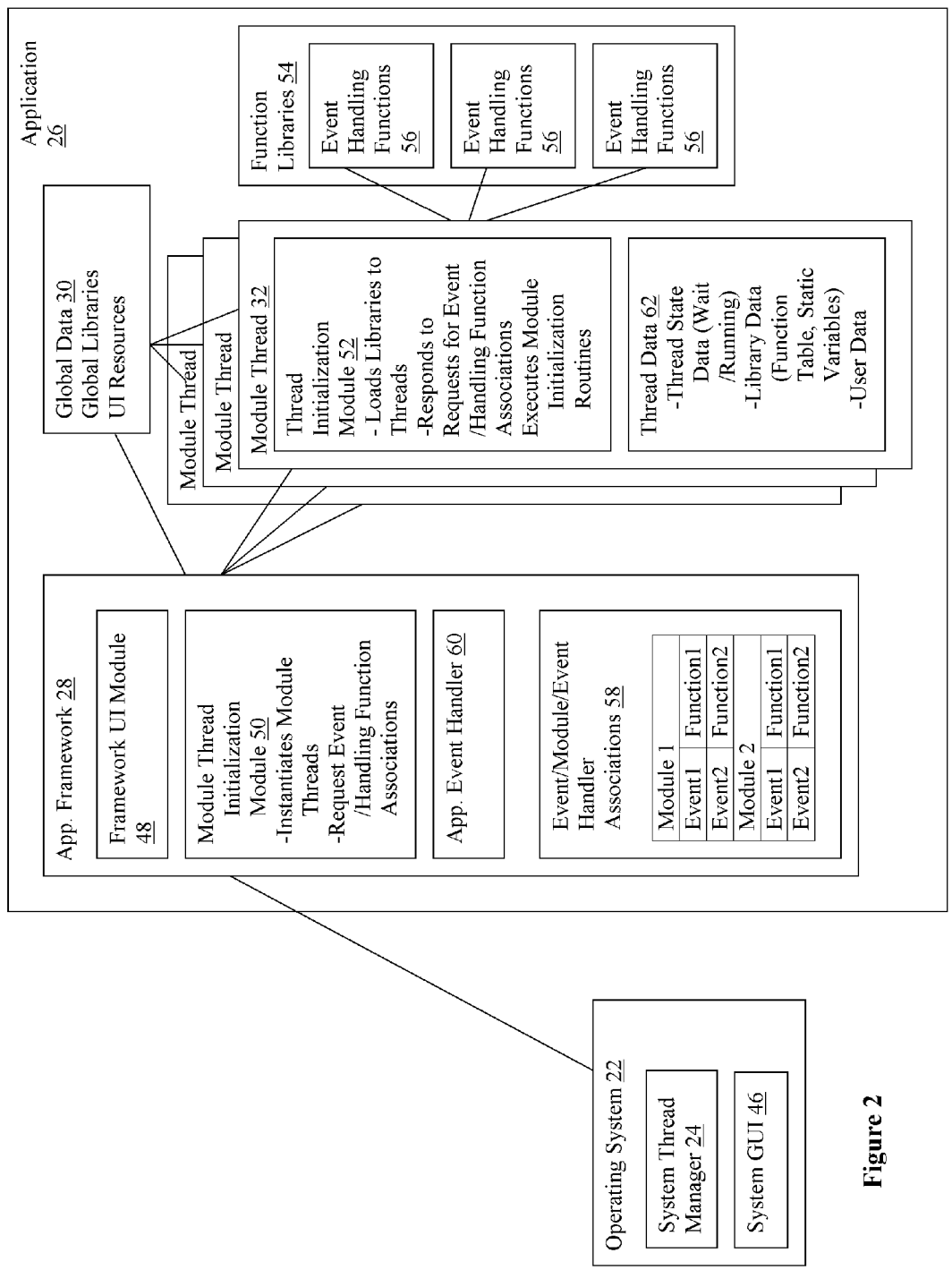
FIG. 2 is a schematic block diagram illustrating components of an application having event-driven state threads in accordance with an embodiment of the present invention.

Referring to FIG. 1, a computer system 10 includes a processor 12 and a memory 14, such as a random access memory RAM. The processor 12 is operable to execute instructions and process data stored in the memory 14. The processor 12 may also be coupled to secondary memory 16, such as a hard drive, flash memory, or the like, for storing additional executable and operational data. User inputs are provided to the processor 12 by input devices 18, such as a keyboard, mouse, touch screen, or the like. The processor 12 may output data to the user by means of a display 20. Other output devices coupled to the processor 12 may include a printer, network adapter, or the like.

The memory 14 may store an operating system 22 containing executable and operational data for causing the processor to execute basic input and output functions, manage computer resources, control the execution of applications, and providing user interface libraries for use by applications executed by the processor.

In a preferred embodiment of the invention, the operating system 22 includes thread manager 24 for controlling the concurrent execution of multiple threads (hereinafter "threads"). The thread management software preferably provides for creating threads, pausing the execution of threads, and associating a thread specific operating context with each thread, such as function libraries, static variables, and the like. The thread specific operating context is preferably local to the thread in scope. However, the thread preferably also accesses libraries and static variables of a global scope belonging to an application or process that creates the thread.

For purposes of this application threads refer to concurrently executing processes that are associated with a single executing application. The threads are part of the operating context of the application rather than independent processes instantiated by an operating system. For purposes of this application, threads may be in a 'wait' or 'non-wait' (active) state. In the 'wait' state the data structures defining the state of execution of the thread continue to exist within the memory of an executing computer. In the 'non-wait' state the thread is processed concurrently with other threads and processes according to thread processing protocols known in the art.

The memory 14 also stores an application 26 including an application framework 28 and corresponding global data 30, including function libraries, static variables, and other data relating to the application framework. The application 26 further includes a plurality of module threads 32. The module threads 32 each correspond to a module of the application having a distinct functionality from the other. Alternatively, the application may include a single module, which may be instantiated by multiple threads 32. The module threads 32 may also be different instances of multiple distinct modules that are either independent or interact with one another. The module threads 32 may be linked with module libraries 34 defining functions and data associated with each module. In a preferred embodiment, some libraries are linked to each thread 32 such that the static variables and functions of the library are associated with the operating context of the thread 32, rather than having global scope. The module libraries 34 may also define classes and objects defining the module threads 32 themselves, which are then instantiated by the application framework 28 to create the module threads 32.

In one embodiment of the invention, each module thread 32 is created when a module is requested or on start-up of the application. The module thread 32 continues to exist as long as the application framework 28 is executed by the processor or until a user specifically instructs the application framework 28 to discontinue processing of the module corresponding to the module thread 32.

Each module thread 32 is programmed to respond to a set of events. After initializing, the module thread 32 places itself in a 'wait' state until one of the events occurs. When processing an event, the module thread 32 is placed in a 'non-wait' state, e.g. a "running" state. The module threads 32 registers with the application framework 28 a number of predefined event handling functions of the module, each corresponding to one of many possible user events that may be received by the application 26. The user events may include, mouse clicks or movements, key presses, and the like.

The application framework 28 receives events from the operating system 22 and determines which handling function of which module thread 32 corresponds to the event. The application framework 28 also examines if the corresponding module thread 32 is in the 'wait' state. If so, the application framework 28 then sets the appropriate module thread 32 to execute the event handling function and changes the state of the thread to its 'non-wait' state. The module thread 32 will then be executed according to the thread manager 24 of the operating system 22. Upon finishing execution, the module thread 32 changes its state to 'wait'.

In contrast with other threaded applications, the module threads 32 persist for the duration of the execution of the module or application. The persistence of the module threads 32 allows the operating context of the threads 32 to maintain data regarding the state of each module, relieving the burden from the application 26. In some embodiments, processing of the application framework 28 includes mapping user events to an appropriate thread, but does not require updating, loading, or processing data regarding the state of a particular module.

Figure 3:
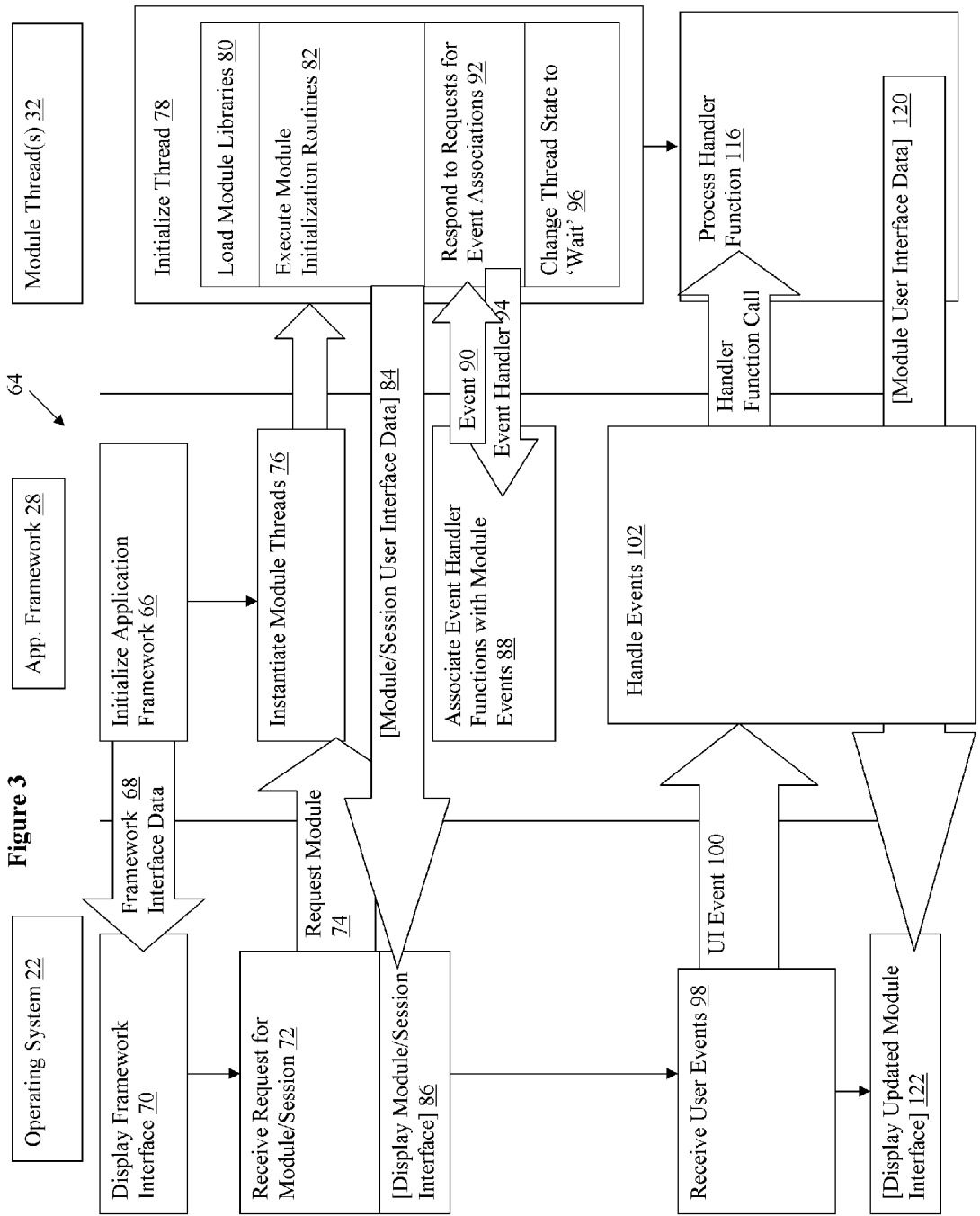
FIG. 3 is a process flow diagram of a method for using event-driven state threads in accordance with an embodiment of the present invention.

Referring to FIG. 3, in some embodiments of the invention, the operating system thread manager 24 is programmed to control concurrent or quasi-concurrent execution of multiple threads. The system thread manager 24 typically enables a thread to transition to and from a 'wait' state, in which the thread does not execute but continues to exist within a pool of threads managed by the thread manager 24. The operating system 22 may host a local graphical user interface (GUI) 46 in embodiments where the user interacts locally with the computer system 10 executing the application 26.

The application framework 28 includes a framework user interface (UI) module 48. The framework UI module 48 receives requests for application resources, including application modules or web-based interactive sessions with a module. The framework user interface UI may display a console window on a local display 20 and receive requests in the form of user events received by the console window, such as mouse clicks on user interface elements, key presses, text entry, or the like.

Upon receiving a request, the framework UI module 48 invokes a module thread instantiation module 50. A module thread 32 is then instantiated by the module thread instantiation module 50 in response to the request. In some embodiments, the module threads 32 are instantiated upon startup of the application rather than upon receiving a request. The module thread 32 may be an instantiation of a module thread 32 corresponding to a specific module and may include a module thread initialization module 52 programmed to load appropriate libraries 54. Alternatively, the module thread 32 may be instantiated and instructed to load libraries corresponding to a specific module by the framework UI module 48. The libraries 54 may include event handling functions 56. Alternatively, the event handling functions 56 may be defined by the module itself of which the module thread 32 is an instance.

The module thread instantiation module 50 will, for each of a predefined set of possible events, pass an event identifier to the thread initialization module 52 of the module thread 32. In response, the module thread 32 returns a function identifier corresponding to the handling function that will process the event. The event identifier may be general such as 'mouse movement' or 'key press.' Alternatively, the event may include a user interface element identifier. For example the event might be of the form 'Button137.rightMouseClick.' The association between the module thread 32, event, and handling function will then be stored in an association table 58, or other data structure suitable for retaining the association data.

Other means for mapping handling functions to events are possible. For example, the thread initialization module 52 may pass an array or table mapping each event to a function.

In some embodiments, event-handling function associations are communicated to the application framework 28 after the thread is initialized. For example, during execution of the thread, a user interface element, such as a button or window, may be created. The module thread 32 may pass an identifier of the button, a user action, and a handling function identifier to the application framework 28, which will then store the association in the association table 58.

The thread initialization module 52 may also execute an initialization routine, which may, among other functions, generate a module user interface for the module. The module user interface may be in the form of a window including standard GUI elements or a web page transmitted to a user's browser 40.

Upon completing some or all of the initialization processes described above, the thread initialization module 52 may place the module thread 32 in a 'wait' state.

The application framework 28 may include an event handler 60. The event handler 60 receives user events from either the operating system for a local user or a remote browser 40 for web based users. The event handler 60 looks up the event in the association table 58 and identifies a corresponding module thread 32 and handling function. The event handler 60 then evaluates whether the corresponding module thread 32 is in a 'wait' state. If not, the event may be ignored. If the corresponding module thread 32 is in a 'wait' state, the event handler 60 sets the module thread 32 to execute the handling function corresponding to the event. The event handler 60 then changes the module thread 32 to a 'non-wait' state. The module thread 32 will then resume execution under the control of the system thread manager 42. When the handling function ends execution, the module thread 32 changes its state back to 'wait.'

During execution, the event handling function executes within the context of the module thread 32, which includes thread data 62, such as the thread state, library data such as static variables and functions, and other user data. Execution of the handling function may include accessing and modifying the thread data 62. Inasmuch as the module thread 32 continues to exist after each event, the changes to the state of the module thread 32 are also preserved. Because the module thread 32 has its own state data of thread-specific scope, there is not a risk of conflicts or data inconsistency that result when multiple threads of execution operate on common data. The module threads 32 may therefore use libraries that are not necessarily 'thread safe.' Such libraries are preferably statically linked to each module thread 32.

Figure 4:
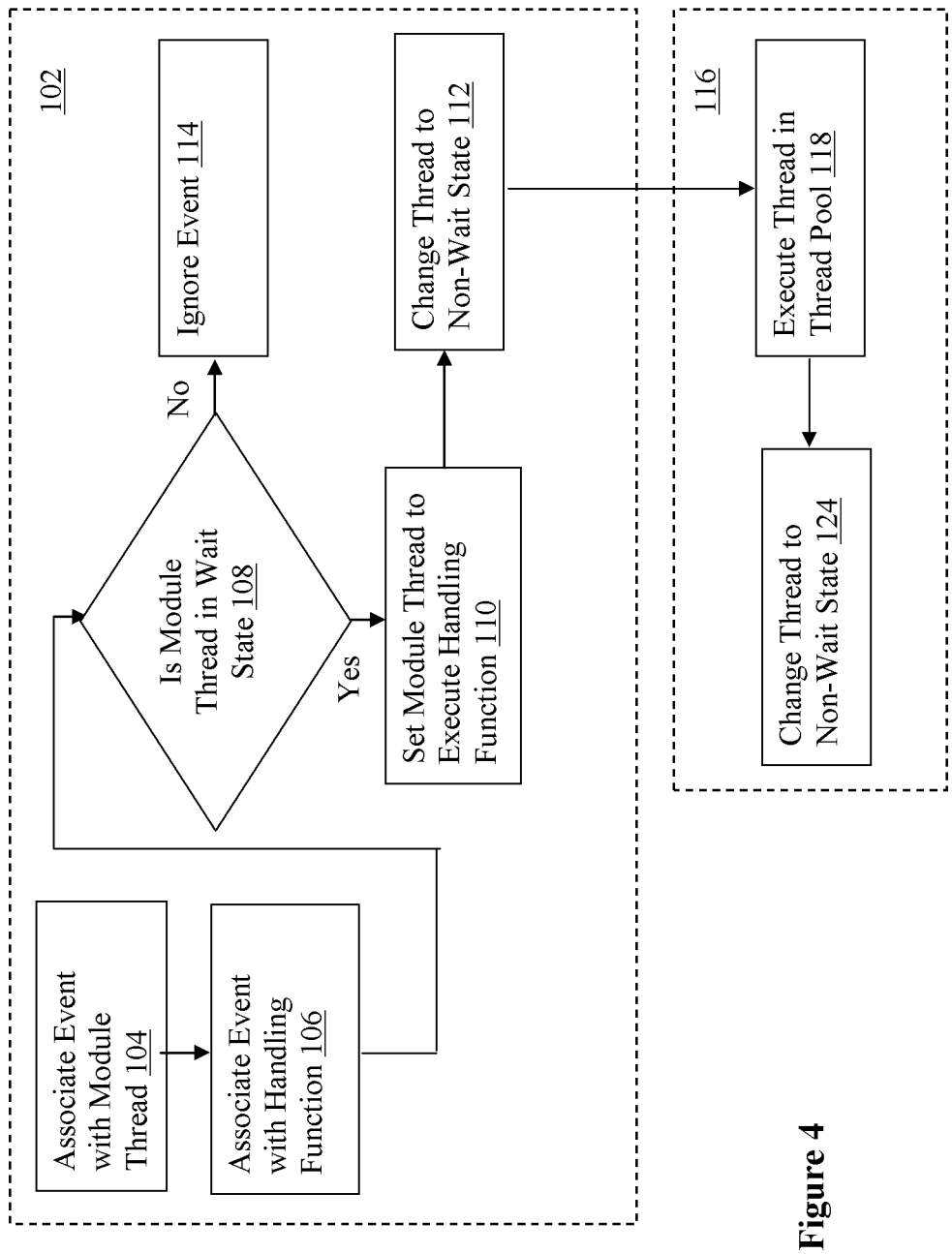
FIG. 4 is a process flow diagram of methods for handling user-generated events using event-driven state threads in accordance with an embodiment of the present invention.

Referring to FIG. 4, a method 64 for executing an event-driven state machine application includes initializing an application framework at block 66. Block 66 may include loading global libraries and generating a framework interface, such as a main window on a local display 20 or a web page transmitted to a remote browser 40. At block 68, the framework interface data is sent to the GUI of a local operating system or a remote browser 40. And at step 70 the framework interface is displayed to a user either on a local display 20 or a remote workstation 38.

At block 72 a request for use of an application module is received either at a local GUI or a remote browser 40. The request is transmitted to the application framework 28 at step 74. In response, the application framework 28 instantiates a module thread 32 at step 76. At step 78 the module thread 32 is initialized. Step 78 may include loading module libraries, including static variables and library functions, at step 80 and executing a module initialization routine at step 82. Step 82 may include generating module interface data that is transmitted to the local GUI or remote browser 38 at step 84 and displayed on the local display 20 or browser 40 at step 86. In some embodiments, interaction with the thread modules 32 is through the framework UI 48 such that steps 84 and 86 may be omitted.

The application framework 28 may create associations between events, module threads 32, and handling functions at step 88. Step 88 may include passing an event identifier to the thread module at step 90. The module thread 32 responds to the event identifier at step 92 by identifying a handling function and passing the identity of the handling function at step 94 to the application framework, which stores the association between the handling function identifier and the event identifier. Steps 88-94 may be repeated for each of a finite set of events that the application framework 28 is programmed to receive. Alternatively, the module thread 32 may pass an array or table containing all event-handling function associations. At the end of the thread initializing step 78, the state of the module thread 32 is changed to 'wait' at step 96.

A user accessing the application may generate a user event that is received by a local GUI or remote browser at step 98. The event is transmitted to the application framework 28 at step 100.

Figure 5:
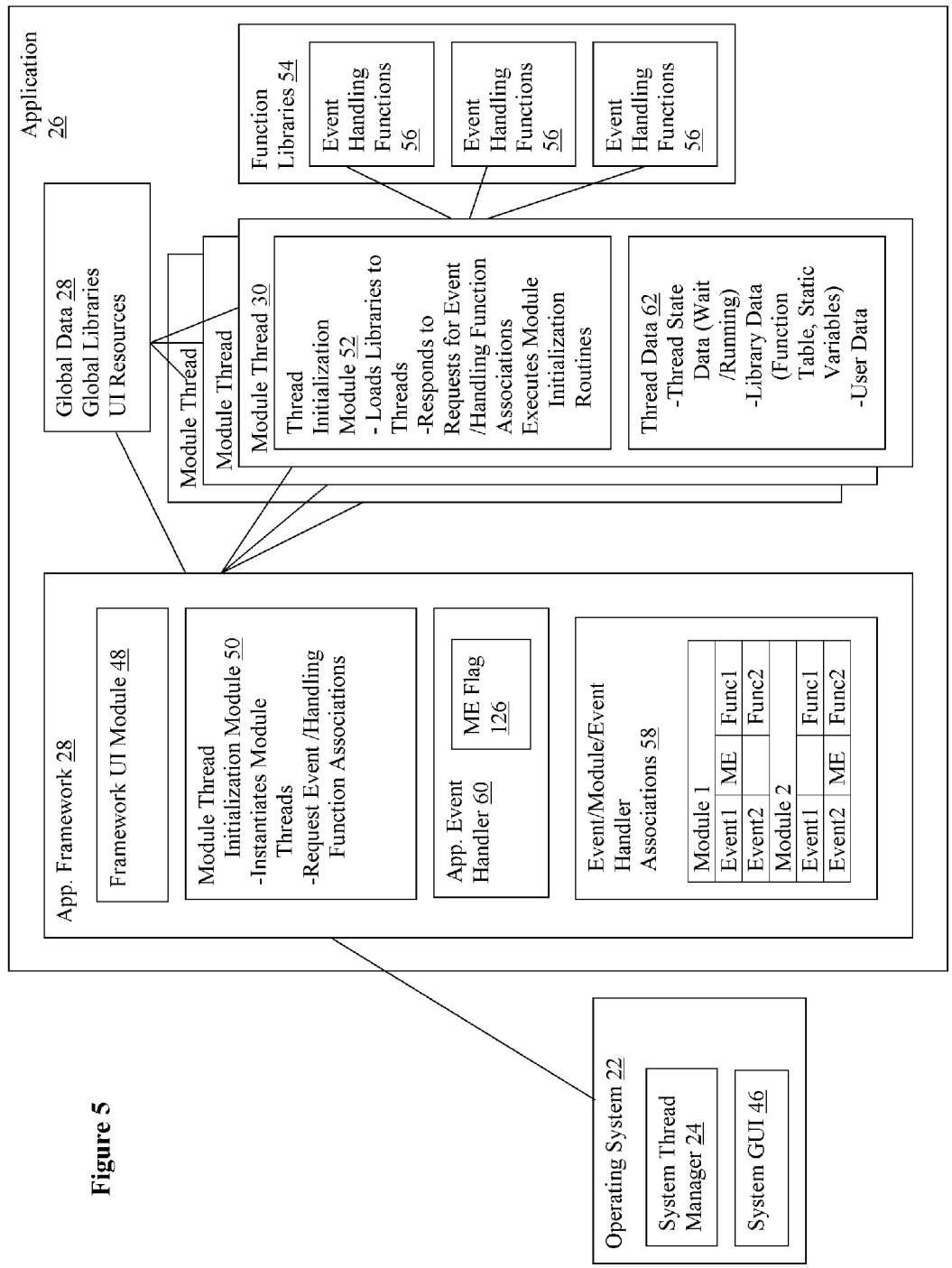
FIG. 5 is a schematic block diagram illustrating components of an application for processing mutually exclusive events using event-driven state threads in accordance with an embodiment of the present invention.

Referring to FIG. 5, while still referring to FIG. 4, at step 102, the event is handled by the application framework 28. Step 102 may include mapping the event to a module thread 32 at step 104. At step 106 the event is mapped to a handling function using the associations generated in steps 88-94. At step 108, the application framework evaluates whether the module thread 32 identified in step 104 is in the 'wait' state. If it is, then at step 110 the module thread 32 is set to execute the handling function identified in step 106. The module thread 32 is then changed to a 'non-wait' or 'active' state at step 112. If the thread is not in the wait state at step 108, then the event may be ignored at step 114.

At step 116, the module thread 32 is processed. Processing at step 116 may include executing the thread within a thread pool under the control of the system thread manager 24 at step 118. Processing at step 118 may also include transmitting updated user interface data and other information at step 120 and displaying the updated information on the local GUI or remote browser 40 at step 122. When the handling function ends execution, the state of the module thread 32 is changed back to 'wait' at step 124, which causes the thread manager 24 to pause execution of the module thread 32.

Figure 6:
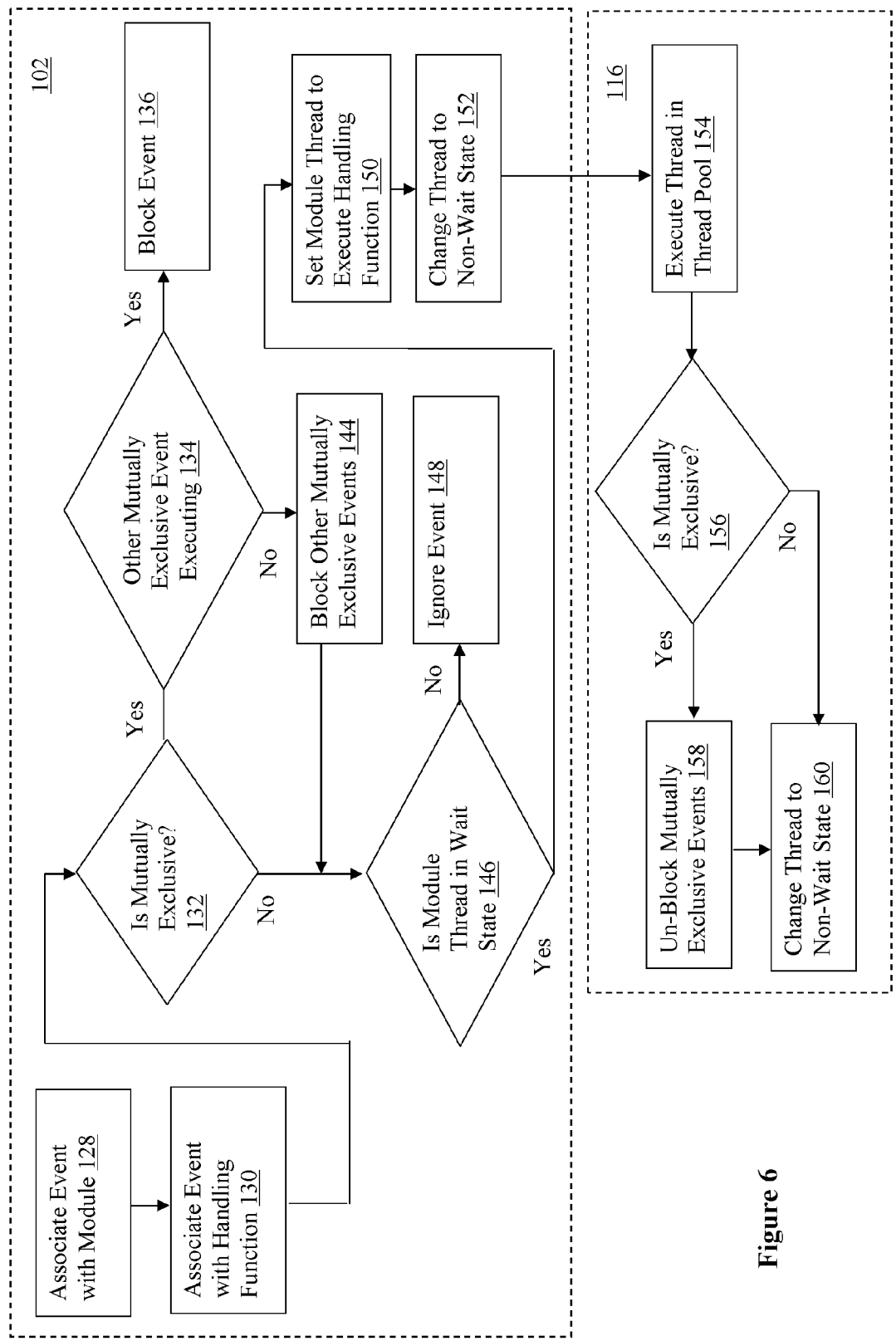
FIG. 6 is a process flow diagram of methods for handling mutually exclusive user-generated events using event-driven state threads in accordance with an embodiment of the present invention.

Referring to FIG. 6, in some embodiments, events are classified as mutually exclusive and non-mutually exclusive. Mutually exclusive events are those that may not be executed concurrently with other mutually exclusive events due to the potential for lock-ups, data corruption, and other errors associated with concurrent execution. For example, in a data recovery system, functions that include writing to a database of backup data may be mutually exclusive with other write functions to avoid write operations to the same location. On the other hand, functions that include only navigating or displaying data from the database may be non-mutually exclusive.

Accordingly, the application framework 28 may include an association table that associates each event with a handling function and also indicates which of the events is classified as mutually exclusive (ME). For example, when a handling function identifier is passed to the application framework at step 94, it may include an indication that the handling function is mutually exclusive. Associating the event handling function with a module and an event at step 88 may further include associating the status of each handling function as mutually exclusive or non-mutually exclusive. In some embodiments, the application framework 28 also includes a status indicator 124 indicating when a ME event is executing.

Figure 7:
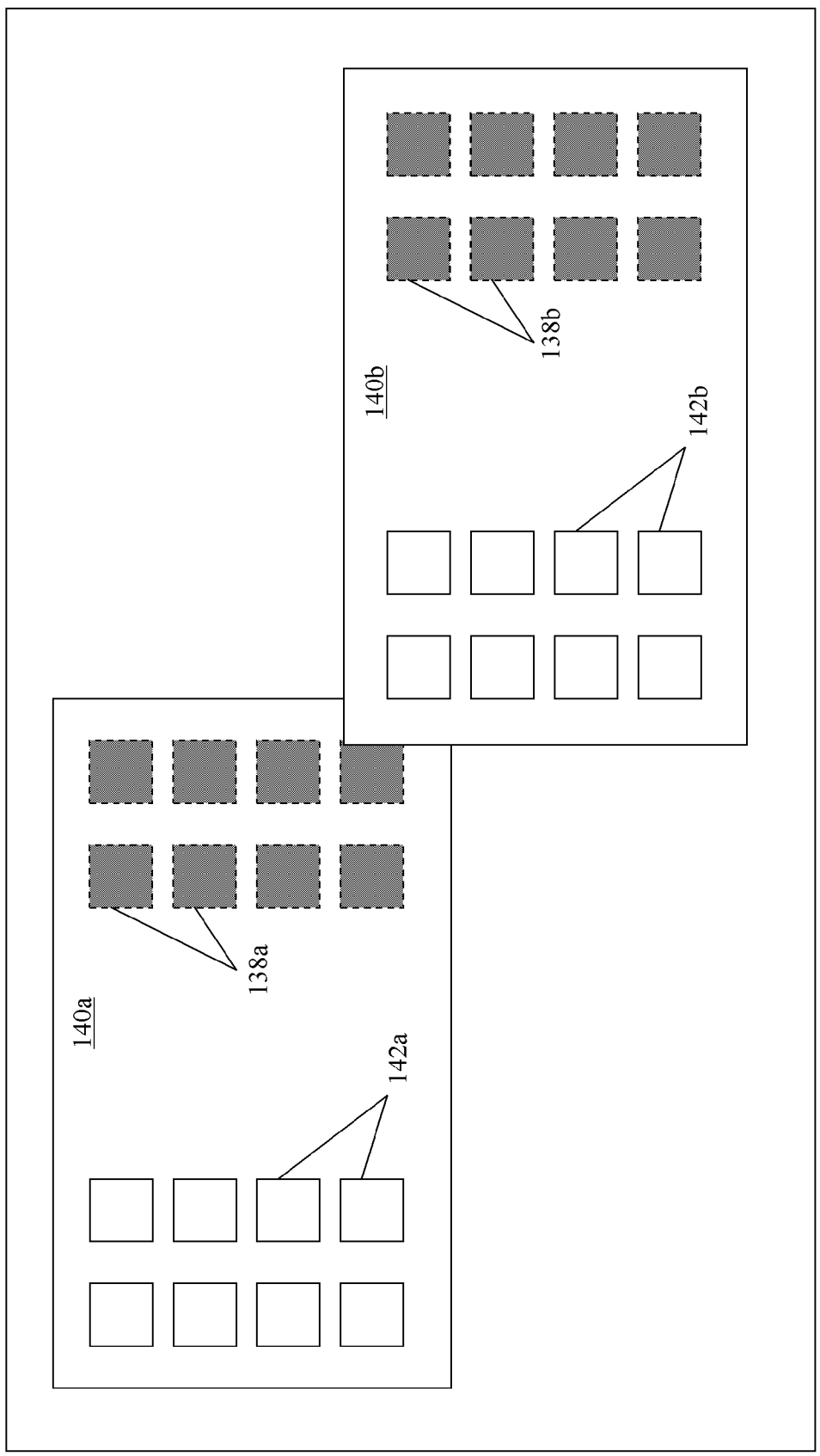
FIG. 7 is a schematic diagram of a user interface suitable for use with an application for processing mutually exclusive events using event-driven state threads in accordance with an embodiment of the present invention.

Referring to FIG. 7, for the embodiment of FIG. 6, the event handling step 102 and thread processing step 116 may handle the processing of mutually exclusive and non-mutually exclusive events. At step 128, an event is associated with an event module. Step 128 may include mapping the window, button, or other UI element with which the user interacted to a specific module thread 32. At step 130 the event is mapped to an event handling function, such as by referencing the Event/Module/Event Handler Associations 58.

At step 132, the application framework 28 evaluates whether the event is a mutually exclusive event. If it is, the application framework 28 evaluates whether another mutually exclusive event is executing at step 134, such as by referencing the ME indicator 126. If so, the event is blocked at step 136. Blocking may include ignoring the event. Alternatively, blocking may include scheduling the event for processing after processing of the currently processed mutually exclusive event. Blocking may also include marking other user interface elements as unavailable. For example, as shown in FIG. 8, user interface elements 138*a*, 138*b* of modules 140*a*, 140*b* are shaded, or otherwise marked, to indicate that they are unavailable whereas elements 142*a*, 142*b* are unmarked, indicating that those interface elements are available.

If no other mutually exclusive event is being processed, other mutually exclusive events are blocked at step 144. Step 144 may include changing the ME indicator 126 to indicate that a mutually exclusive event is executing.

At step 146, the application framework evaluates whether the module thread 32 identified at step 130 is in the 'wait' state. If not, the event is ignored at step 148. If the module thread 32 is in the 'wait' state, then at block 150 the module thread 32 is set to execute the handling function identified at step 130. At step 152 the state of the thread is changed to a 'non-wait' state.

For the application framework of FIG. 6, processing the handling event at step 116 may include executing the handling function within the thread pool at step 154, such as under the control of the thread manager 24. When the handling function finishes executing, the module thread 32, or application framework evaluates whether the event was a mutually exclusive event at step 156. If it is then the module thread 32 or, application framework 28, unblocks other mutually exclusive events at step 158, such as by changing the ME indicator 126 to indicate that no mutually exclusive event is currently executing. In either case, the state of the module thread 32 is changed to 'wait' at step 160.

The above described handling of mutually exclusive and non-mutually exclusive events enables the development of modular applications that are readily expanded to include additional modules without the modification of prior modules. Inasmuch as each module thread 32 registers its own event handlers with the application framework 28, additional threads can identify to the application framework which event handling functions will give rise to conflicts. The event handling function 28 is then enabled to avoid conflicts for both the original and added modules.

Embodiments include general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing an event-driven interface comprising:

within an application framework of a single application:

receiving a plurality of user generated events each corresponding to user interaction with one of a plurality visual representations of a plurality of modules, associating each of the plurality of user generated events with one of a plurality of module threads corresponding to the visual representation corresponding to the user generated event, wherein each module thread persists during execution of the application framework and wherein each module thread has a corresponding thread state and each module thread maintains data regarding its corresponding thread state, user data, and library data, wherein each of the module threads is in a wait state or in an active state and wherein the data is maintained in a memory for each of the module threads in the wait state, evaluating whether each of the plurality of user generated events is a mutually exclusive event or non-mutually exclusive event, enabling at least a portion of the non-mutually exclusive events to be handled, and enabling each mutually exclusive event to be handled only if no other mutually exclusive event is being handled, wherein mutually exclusive events cannot be handled concurrently and other mutually exclusive events are blocked when handling one of the mutually exclusive events; and within at least a portion of the module threads, concurrently handling at least a portion of the plurality of user generated events by executing handling functions corresponding to the non-mutually exclusive events and one of the mutually exclusive events that is enabled to be handled, wherein a thread manager associated with an operating system manages concurrent execution of the threads while the module threads are associated only with the single application and operate in the context of the single application.

2. The method of claim 1, wherein each thread has a wait and a non-wait state, the method further comprising enabling the plurality of user-generated events to be handled only if one of the module threads associated with the one of the plurality of user generated events is in the non-wait state.

3. The method of claim 1, further comprising communicating from each of the module threads to the application framework a plurality of event handling function identifiers and an exclusivity indicator indicating whether the event is mutually exclusive or non-mutually exclusive.

4. The method of claim 1, wherein the module threads comprise state data and wherein concurrently handling at least a portion of the plurality of user generated events comprises accessing and modifying the state data.

5. The method of claim 1, wherein each module thread comprises a distinct functionality relative to the other module threads.

6. The method of claim 1, wherein concurrently handling at least a portion of the plurality of user generated events comprises executing the module threads under control of a thread managing system of an operating system.

7. A method for providing an event-driven interface within an application framework of a single modular application, the method comprising:
   receiving a plurality of events comprising mutually exclusive and non-mutually exclusive events, each event corresponding to a module of the modular application, each module having a module thread having a wait and a non-wait state, wherein each module thread persists during execution of the modular application and wherein each module thread has a corresponding thread state and each module thread maintains data about its corresponding thread state, user data, and library data, wherein the data is maintained in a memory for each of the module threads in the wait state;
   allowing one of the mutually exclusive events to be processed only if no other mutually exclusive event is being processed, wherein the other mutually exclusive event is blocked when the one of the mutually exclusive event is processed;
   for each non-mutually exclusive event and mutually exclusive event that is allowed to be processed, communicating the event to the module thread corresponding thereto and placing the module thread in the non-wait state if the module thread is in the wait state, wherein mutually exclusive events cannot be handled concurrently; and
   processing all threads in the non-wait state according to a multi-tasking protocol, wherein a thread manager associated with an operating system manages concurrent execution of the threads while the module threads are associated only with the single modular application and operate in the context of the single modular application.

8. The method of claim 7, further comprising communicating from each of the module threads to an application framework a plurality of event handling functions and an exclusivity indicator indicating whether the function is mutually exclusive or non-mutually exclusive.

9. The method of claim 8, further comprising, within the application framework, receiving each event, mapping the event to one of the module thread and one of the event handling functions, and evaluating whether the event corresponds to one of the mutually exclusive handling functions.

10. The method of claim 7, wherein the module threads comprise state data for the module and wherein processing all threads in the non-wait state according to the multi-tasking protocol comprises accessing and modifying the state data.

11. The method of claim 7, wherein each thread corresponds to a different module having a distinct functionality relative to other modules.

12. The method of claim 7, wherein processing all threads in the non-wait state according to the multi-tasking protocol comprises executing the threads under control of a thread managing system of an operating system.

13. A computing system comprising:
   a general purpose computer having a processor programmed to process operational and executable data and a memory storing an application operable to instruct the processor to:
   initiate execution of an application framework module; and within the application framework module of a single application:
      initiate execution of a plurality of module threads, wherein each module thread persists during execution of the application framework module and wherein each module thread has a corresponding thread state and each module thread maintains data regarding its corresponding thread state, user data, and library data, wherein each of the module threads is in a wait state or in an active state and wherein the data is maintained in a memory for each of the module threads in the wait state;
      display a plurality of module interfaces each corresponding to one of the module threads;
      receiving a plurality of user generated events each generated by one of a plurality of module interfaces displayed to a user;
      evaluate whether each of the plurality of user generated events is a mutually exclusive event or non-mutually exclusive event;
      enable at least a portion of the non-mutually exclusive events to be handled;
      enabling each mutually exclusive event to be handled only if no other mutually exclusive event is being handled, wherein mutually exclusive events cannot be handled concurrently and other mutually exclusive events are blocked when handling one of the mutually exclusive events; and
      modify a portion of the module threads to concurrently execute handling functions corresponding to the at least a portion of the non-mutually exclusive events and one of the mutually exclusive events that is enabled to be handled,
      wherein the application framework module includes a status indicator indicating when a mutually-exclusive event is being handled to ensure that mutually exclusive events are not handled concurrently,
      wherein a thread manager associated with an operating system manages concurrent execution of the module threads while the module threads are associated only with the single application and operate in the context of the single application.

14. The computing system of claim 13, wherein the processor is programmed to enable the non-mutually exclusive events and mutually exclusive events to be handled only if one of the module threads corresponding to the one of the plurality of module interfaces that generated the event is in a wait state.

15. The computing system of claim 14, wherein the processor is programmed to place the portion of the module threads concurrently executing handling functions in a non-wait state.

16. The computing system of claim 13, wherein each module thread corresponds to a different module having a distinct functionality relative to other threads.

17. The computing system of claim 13, wherein the memory stores an operating system programmed to manage concurrently executing the handling functions.

* * * * *